United States Patent [19]
Komatsu et al.

[11] Patent Number: 4,761,339
[45] Date of Patent: Aug. 2, 1988

[54] SINTERED CERAMIC ARTICLES AND METHOD FOR PRODUCTION THEREOF

[75] Inventors: Michiyasu Komatsu, Yokohama; Isao Ikeda, Yokosuka, both of Japan

[73] Assignee: Kabushiki Kaisha Toshiba, Kawasaki, Japan

[21] Appl. No.: 878,650

[22] Filed: Jun. 26, 1986

Related U.S. Application Data

[63] Continuation-in-part of Ser. No. 716,215, Mar. 26, 1985, abandoned.

[30] Foreign Application Priority Data

Mar. 27, 1984 [JP] Japan ................................. 59-58593

[51] Int. Cl.$^4$ ............................................. C04B 35/58
[52] U.S. Cl. ..................................... 428/446; 428/698; 428/699
[58] Field of Search ............... 428/446, 698, 699, 701; 427/237

[56] References Cited

U.S. PATENT DOCUMENTS

| | | | |
|---|---|---|---|
| 3,895,219 | 7/1975 | Richerson et al. | 428/446 X |
| 4,099,924 | 7/1978 | Berkman et al. | 427/237 X |
| 4,187,344 | 2/1980 | Fredriksson | 428/698 X |
| 4,622,186 | 11/1986 | Mizutani | 428/698 X |

Primary Examiner—Nancy A. B. Swisher
Attorney, Agent, or Firm—Finnegan, Henderson, Farabow, Garrett & Dunner

[57] ABSTRACT

Sintered ceramic articles and a method for the production thereof are disclosed. When a shaped $Si_3N_4$ ceramic article is sintered in the presence of $SiO_2$ or a $SiO_2$-containing substance in an inactive gas atmosphere, there is obtained a sintered ceramic article having the surface thereof coated with a thin layer formed preponderantly of silicon oxynitride ($Si_2N_2O$).

The sintered ceramic article of this invention excels in resistance to elevated temperatures, particularly temperatures exceeding 1200° C., and enjoys a good surface condition.

2 Claims, 1 Drawing Sheet

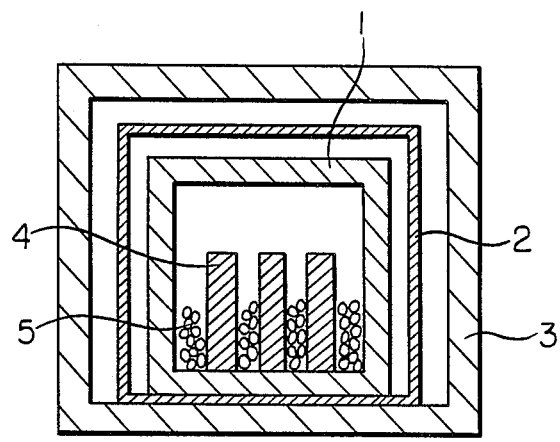

SINTERED CERAMIC ARTICLES AND METHOD FOR PRODUCTION THEREOF

The present application is a continuation-in-part of U.S. patent application Ser. No. 716,215 filed on Mar. 26, 1985 now abandoned.

The present application claims priority of Japanese Patent Application Ser. No. 59-58593 filed on Mar. 27, 1984.

BACKGROUND OF THE INVENTION

This invention relates to a sintered ceramic articles and a method for production thereof excelling in resistance to oxidation at elevated temperatures and enjoying good surface conditions.

Since sintered ceramic articles formed preponderantly of $Si_3N_4$ excel in heat resistance and resistance to thermal shock, the feasibility of such articles in applications to structural parts such as gas turbine blades and nozzles which are required to offer high strength at elevated temperatures is being studied.

It is known that these sintered $Si_3N_4$ ceramic articles have their strength lowered by oxidation at elevated temperatures exceeding 1200° C. Thus, the desirability of improving these articles in resistance to oxidation is finding growing recognition. Davidge et.al. discloses (U.S. Pat. No. 3,824,120) a method of increasing the strength of a product containing porous $Si_3N_4$ to be formed $SiO_2$ to internal pores and on external surface by oxidizing at about 1000° C. The method of this invention is effective for the porous products. However, this invention has no aptitude for improvement of $Si_3N_4$ products which have a fine density concerning only the surface. Namely, since a degradation by oxidation and forming of $SiO_2$ proceed simultaneously at elevated temperature, it is difficult to set a condition for oxidation. Rather, it causes decreased strength of the products.

Fredriksson discloses (U.S. Pat. No. 4,187,344) that an improvement in resistance to oxidation at elevated temperatures by coating a slurry of $Si_3N_4$ or $Si_2OH_2$ etc. to porous refractory article, heating at about 1000° C., increasing strength of internal pores and external surface. However, this invention relates to slurry coating and it is difficult to apply a slurry; and its effectiveness seems to be not enough.

Sarin et.al. discloses (U.S. Pat. No. 4,406,668) that cutting tools comprising a silicon nitride substrate consists of a first phase of silicon nitride and a second phase of silicon nitride and metal oxide ($Sio_2$, $Al_2O_3$ etc.), and additionally coated metal nitride (TiN etc.). The product of invention is to be anticipated as a fine sintered ceramic article, but it has no aptitude for a material such as turbine blade. Coating requires special instruments such as CVD.

These sintered ceramic articles are generally desired, for the purpose of decreasing the cost of sintering, to be producted by the procedure of placing a plurality of shaped articles of $Si_3N_4$ in a container made of $Al_2O_3$ and sintering them in a furnace under an inactive gas atmosphere. This method of sintering however, has entailed a problem that during the course of sintering part of $Si_3N_4$ is decomposed into Si or $SiO_2$ and $N_2$ and expelled out of the shaped articles, leaving behind coarsened surface.

SUMMARY OF THE INVENTION

This invention, with a view to overcoming the aforementioned disadvantage of the prior art, aims to provide sintered ceramic articles and a method for production thereof excelling the resistance to oxidation at elevated temperatures exceeding 1200° C. and enjoying good surface conditions.

The sintered ceramic articles of the present invention are characterized by having a thin layer preponderantly of silicon oxynitride ($Si_2N_2O$), resulting from a reaction of $Si_3N_4$ and $SiO_2$ formed on the surface of sintered $Si_3N_4$ ceramic articles. The method of this invention for the production of such sintered ceramic articles is characterized by the steps of molding a powdered raw material preponderantly of $Si_3N_4$ in a prescribed shape and sintering the resultant shaped ceramic articles in the presence of $SiO_2$ or a mixture containing $SiO_2$ in a furnace under an inactive gas atmosphere.

BRIEF DESCRIPTION OF THE DRAWING

The drawing is a cross-sectional diagram illustrating in cross section a sintering furnace to be used in the production of sintering ceramic articles of this invention.

DETAILED DESCRIPTION OF THE INVENTION

Sintered ceramic articles used in this invention are obtained by using $Si_3N_4$ powder as a main component, adding thereto as a sintering aid one member or a mixture of two or more members selected from the group consisting of oxides of rare earth elements, such as $Y_2O_3$, and $Al_2O_3$, AlN, $TiO_2$, MgO, $ZrO_2$, $HfO_2$ etc. optionally further adding thereto an organic binder, molding the resultant mixture in a prescribed shape, degreasing the shaped mixture, and sintering it. And the density of sintered article is at least 3.0 gr/cm$^3$ or more.

In the present invention, the thin layer of $Si_2N_2O$ manifests an effect of conferring upon the sintered ceramic article the resistance to oxidation at elevated temperatures exceeding 1200° C. and consequently preventing the sintered ceramic article from lowering of strength. This layer is desired to have a thickness in the range of 5 to 500 μm, preferably 10 to 250 μm.

The thin layer of $Si_2N_2O$ is formed by the following method.

First, $Si_3N_4$ powder and a sintering aid are mixed, optionally in conjunction with an organic binder. The mixture so produced is molded in a prescribed shape and heated to degrease.

The shaped article so produced is placed in conjunction with $SiO_2$ or a mixture containing $SiO_2$ in a sintering furnace and sintered under an inactive gas atmosphere such as nitrogen gas or forming gas at 1700° to 1800° C. for 1 to 4 hours. The furnace for the sintering is desired to be a closed sintering container made of $Al_2O_3$ or $Si_3N_4$. The sintering container may be in a double-wall construction intended to ensure airtight closure. The atmosphere for the sintering may be under normal pressure. When desired, the pressure of the atmosphere can be increased up to about 10 kg/cm$^3$.

The $SiO_2$ or the mixture containing $SiO_2$ is added to the furnace interior for the purpose of allowing the atmosphere of sintering to contain $SiO_2$ gas. Thus, $SiO_2$ can be used alone or as mixed with some other substance. It is used in a powdered, granulated, or pelletized form.

For the convenience of the operation, $SiO_2$ is desired to be used in the form of a mixture with some other substance. This mixture is desired to be obtained by mixing $SiO_2$ and $Si_3N_4$ both in powdered form and molding the resultant mixture in a desired shape, preferably in the shape of pellets.

During the source of sintering, since $SiO_2$ are sublimated at 1550° to 1600° C., the $Si_3N_4$-$SiO_2$ pellets expel $SiO_2$ into the atmosphere to increase the partial pressure of $SiO_2$ in the atmosphere and consequently to control the otherwise possible decomposition of the sintered $Si_3N_4$ ceramic article. The sublimated $SiO_2$ is condensed in the form of frost on the inner wall of the closed container, on the surface of the shaped article being sintered, or on the inner wall of the sintering furnace. The condensed $SiO_2$ can be easily removed from the surface. On the other hand, the residual $Si_3N_4$ can be easily crushed. Thus, the two materials so recovered can be put to use repeatedly, promoting economization of resources. In the shaped mixture of $Si_3N_4$-$SiO_2$, such as pellets, the $SiO_2$ component is desired to account for 10 to 50% of the whole amount of the mixture.

The amount of $SiO_2$ of the $SiO_2$-containing mixture to be placed in the furnace is selected to fall in the range of 0.1 to 20%, preferably 2 to 10%, as $SiO_2$ based on the weight of the shaped ceramic article. The volume to be occupied by the $SiO_2$ or $SiO_2$-containing mixture and the shaped ceramic article is required to exceed 50% of the whole internal volume of the firing container. In the case of a tightly closed firing container, the ratio of $SiO_2$ to the shaped ceramic article can be decreased in proportion as the volume ratio mentioned above is increased.

When the amount of $SiO_2$ falls in the range mentioned above, $Si_3N_4$ and $SiO_2$ react with each other to give rise to a thin layer of $Si_2N_2O$ on the surface of the sintered $Si_3N_4$ ceramic article, enabling the sintered article to acquire improved strength at elevated temperatures and improved surface condition.

Now, the present invention will be described more specifically below with reference to working examples. It should be noted, however, that the present invention is not limited in any sense by these examples.

EXAMPLES 1-4

A powdered mixture consisting of 5 wt% of $Y_2O_3$, 3 wt% of $Al_2O_3$, 3 wt% of AlN, and 0.5% of $TiO_2$ collectively as a sintering aid and the balance of $Si_3N_4$ and 7% of an organic binder such as paraffin were blended and molded in the shape of a square block, 50 mm×50 mm×10 mm, followed by degreasing.

Separately, 20 wt% of $SiO_2$ and 80 wt% of $Si_3N_4$ were mixed in powdered form and the resultant mixture was molded to obtain $SiO_2$ type pellets.

A sintering furnace was used, as illustrated in the drawings, of a tightly closed cylindrical container 1 made of $Al_2O_3$ and measuring 200 mm in inside diameter and 60 mm in height, a tightly closed container 2 made of $Si_3N_4$ and adapted to enclose the cylindrical container 1, and a carbon container 3 adapted to accommodate the container 2. In the $Al_2O_3$ cylindrical container 1, 40 shaped ceramic articles (products) 4 prepared as described above were placed. In the cavity intervening between the cylindrical container and the products, the $SiO_2$ type pellets were placed in a varying filling ratio of 60% to 80% selected so that the amount of $SiO_2$ would account for 2%, 5%, or 10% of the weight of the products. The products were then subjected to sintering. The sintering was performed in the atmosphere of forming gas at 1750° C. for four hours.

The sintering ceramic articles consequently obtained were tested for density, ratio of weight loss during the conversion of shaped articles to sintered articles, flexural strength at room temperature and after 3000 hours' standing in air at 1200° C., surface condition, and thickness of $Si_2N_2O$ layer. The results were as shown in Table 1. The data given in the table under the heading "Comparative Experiment" represent the properties obtained of sintered ceramic articles produced in the absence of $SiO_2$.

TABLE 1

|  | Example | | | | Comparative Experiment | |
| --- | --- | --- | --- | --- | --- | --- |
|  | 1 | 2 | 3 | 4 | | |
| Ratio of $SiO_2$ (%) | 2 | 5 | 10 | 15 | 1 | 2 |
| Density (gr/cm$^3$) | 3.23 | 3.23 | 3.23 | 3.23 | 3.20 | 3.18 |
| Weight loss (%) | 0.5 | 0.1 | 0.1 | 0.1 | 3 | 4 |
| Flexural strength (kg/mm$^2$) Room temperature | 105 | 100 | 95 | 97 | 90 | 85 |
| After heating | 98 | 95 | 92 | 95 | 70 | 65 |
| Surface condition | Smooth | Smooth | Smooth | Smooth | Coarse | Coarse |
| Thickness of $Si_2N_2O$ layer (μm) | 10 | 50 | 250 | 320 | 0 | 0 |

EXAMPLES 5-7

A powdered mixture consisting of 5 wt% of $Y_2O_3$, 3 wt% of $Al_2O_3$, 2 wt% of MgO, and 0.5% of $TiO_2$ collectively as a sintering aid and the balance of $Si_3N_4$ and 7% of an organic binder such as paraffin were blended and molded in the shape of a square block, 50 mm×50 mm×10 mm, followed by degreasing.

Separately, 40 wt% of $SiO_2$ and 60 wt% of $Si_3N_4$ were mixed in powdered form and the resultant mixture was molded to obtain $SiO_2$ type pellets.

The process, conditions and tests were same as in Examples 1-3, except for the amount of $SiO_2$ which would account for 1%, 3% or 6% of the weight of the products. The results were as shown in Table 2.

TABLE 2

|  | Example | | |
| --- | --- | --- | --- |
|  | 5 | 6 | 7 |
| Ratio of $SiO_2$ (%) | 1 | 3 | 6 |
| Density (gr/cm$^3$) | 3.21 | 3.23 | 3.23 |
| Weight loss (%) | 1.0 | 0.3 | 0.1 |
| Flexural strength (kg/mm$^2$) Room temperature | 95 | 102 | 98 |
| After heating | 85 | 97 | 95 |
| Surface condition | Smooth | Smooth | Smooth |
| Thickness of $Si_2N_2O$ layer (μm) | 5 | 20 | 60 |

It is noted from Table 1 to 2 that the sintered ceramic articles according to this invention possess high resistance to oxidation at elevated temperatures and, therefore, suffer from small loss of strength and, because of the small loss of $Si_3N_4$, enjoy good surface conditions.

What is claimed is:

1. A sintered ceramic article having a smooth, thin reaction-formed surface layer preponderantly of silicon oxynitride ($Si_2N_2O$) formed on a surface of a sintered $Si_3N_4$ article having a density of 3.0 gr/cm$^3$ or more, said silicon oxynitride being a reaction product of $SiO_2$ and $Si_3N_4$ of said sintered article.

2. A sintered ceramic article according to claim 1, wherein said silicon oxynitride layer has a thickness in the range of 5 to 500 μm.

* * * * *